(12) United States Patent
Koike et al.

(10) Patent No.: US 6,933,348 B2
(45) Date of Patent: Aug. 23, 2005

(54) METHOD OF PRODUCING POWDERY COATING MATERIAL

(75) Inventors: Nobuyuki Koike, Hiratsuka (JP); Shojiro Kuwahara, Hiratsuka (JP)

(73) Assignee: Mitsubishi Gas Chemical Co., Inc., Tokyo (JP)

( * ) Notice: Subject to any disclaimer, the term of this patent is extended or adjusted under 35 U.S.C. 154(b) by 0 days.

(21) Appl. No.: 10/096,437

(22) Filed: Mar. 13, 2002

(65) Prior Publication Data

US 2003/0073780 A1 Apr. 17, 2003

(30) Foreign Application Priority Data

Mar. 13, 2001 (JP) ........................................ 2001-069685
Apr. 25, 2001 (JP) ........................................ 2001-126989

(51) Int. Cl.⁷ ............................................. C08F 269/00
(52) U.S. Cl. .................... 525/286; 525/295; 525/327.2; 525/374; 525/375; 525/379; 525/382; 525/386
(58) Field of Search ................................. 525/286, 295, 525/327.2, 374, 375, 379, 382, 386, 327.3; 524/379; 264/141

(56) References Cited

U.S. PATENT DOCUMENTS

| | | | | |
|---|---|---|---|---|
| 3,752,870 A | * | 8/1973 | Labana et al. ............... | 523/437 |
| 3,787,521 A | * | 1/1974 | Labana ........................ | 525/384 |
| 3,790,513 A | * | 2/1974 | Victorius ..................... | 524/40 |
| 3,817,946 A | * | 6/1974 | Ree ............................. | 526/273 |
| 3,893,977 A | | 7/1975 | Wingler | |
| 3,989,767 A | * | 11/1976 | Homma et al. .............. | 525/28 |
| 4,009,131 A | | 2/1977 | Farone | |
| 4,091,049 A | * | 5/1978 | Labana et al. ............... | 525/117 |
| 4,281,076 A | * | 7/1981 | Kamimura ................... | 525/124 |
| 5,270,416 A | * | 12/1993 | Toman et al. ................ | 526/273 |
| 5,472,649 A | * | 12/1995 | Chang et al. ................. | 264/15 |
| 5,708,039 A | * | 1/1998 | Daly et al. .................... | 521/61 |
| 6,309,572 B1 | * | 10/2001 | Isozaki et al. ............... | 264/102 |
| 6,583,187 B1 | * | 6/2003 | Daly et al. .................... | 521/56 |

FOREIGN PATENT DOCUMENTS

| | | | |
|---|---|---|---|
| JP | 10-053729 | * | 2/1998 |
| JP | 11-080613 | * | 3/1999 |
| JP | 11-302567 | | 11/1999 |

* cited by examiner

Primary Examiner—William K. Cheung
(74) Attorney, Agent, or Firm—Sherman & Shalloway (57) ABSTRACT

Disclosed is a method of producing a powdery coating material by using a curable acrylic resin (A) having a number average molecular weight of from 2,000 to 20,000 and a glass transition temperature of from 30 to 90° C. obtained by polymerizing a starting monomer containing from 15 to 50 mol % of an unsaturated compound which contains at least a glycidyl group and/or a methylglycidyl group, and from 20 to 50 mol % of methyl methacrylate; a curing agent (B) capable of being reacted with the glycidyl group or the methylglycidyl group constituting the curable acrylic resin (A); and an alcohol solvent (C) having a boiling point under normal pressure of from 70 to 120° C.; said method comprising a kneading step of so kneading the curable acrylic resin (A), the curing agent (B) and the alcohol solvent (C) that at least the curing agent (B) is dissolved in the alcohol solvent (C) at a temperature of not higher than 130°C., and a vapor-removing step of continuously vapor-removing the alcohol solvent (C) under a reduced pressure at a temperature of not higher than 130° C.

14 Claims, 4 Drawing Sheets

METHOD OF PRODUCING POWDERY COATING MATERIAL

BACKGROUND OF THE INVENTION

1. Field of the Invention

The present invention relates to a method of producing a powdery coating material comprising a curable acrylic resin.

2. Description of the Related Art

Powdery coating materials do not generate volatile organic substances during the baking, do not cause environmental problems such as air pollution, and have, hence, been used in a wide field of applications to substitute for the solution coating materials.

As such powdery coating materials, there has been known an acrylic powdery coating material containing, for example, a curable acrylic resin having a glycidyl group and a curing agent as represented by an aliphatic dibasic acid.

The powdery coating material is generally prepared by dry-mixing a curable resin, a curing agent, additives for the coating material and pigment, kneading and dispersing them by using a melt kneader, followed by the pulverization and classification. In heating and melt-kneading the curable resin and the curing agent according to this method, however, it is necessary to suppress the crosslinking reaction between the curable resin and the curing agent. Therefore, limitation is imposed such as effecting the kneading at a temperature lower than the melting point of the curing agent, making it difficult to homogeneously disperse the resin and the curing agent. Further, the film formed by using the thus produced powdery coating material has problems concerning the appearance and, particularly, lacking smoothness. Besides, the pigment is poorly dispersed making it difficult to obtain a film that exhibits vividness comparable to that of solution coating materials.

In order to improve such problems, there have been proposed methods of mixing a curable resin and a curing agent in a wet manner, i.e., in a solvent (Japanese Unexamined Patent Publications (Kokai) Nos. 25531/1979, 53729/1998, 302567/1999, 103866/2000).

Even with these methods, however, the curable resin and the curing agent are not necessarily dispersed sufficiently homogeneously, still leaving many problems such as the necessity of vessels for dissolving starting coating materials, mixing devices for mixing the solutions thereof, and a large apparatus for vapor-removing/recovering large amounts of solvent.

U.S. Pat. No. 6,309,572 discloses a method of producing a powder coating material in which a curable acrylic resin is prepared in methanol and the obtained resin solution is wet-mixed with a curing agent. Methanol has a low boiling point and is vapor-removed easily. However, when methanol is used in the process for producing the acrylic resin and in the process for the powder coating material, methanol contacts with a glycidyl group and/or a methyl glycidyl group contained in the acrylic resin for a long time during being heated. In the result, the ring of the glycidyl group or the methyl glycidyl group is opened by methanol, therefore, the anti-blocking property of the obtained powder coating material and the mechanical property of the film are impaired.

SUMMARY OF THE INVENTION

It is an object of the present invention to provide a method of producing an acrylic powdery coating material, which is capable of homogeneously dispersing a curable resin and a curing agent using simple means and of forming a film featuring excellent smoothness and luster at a low cost.

According to the first embodiment the present invention, there is provided a method of producing a powdery coating material by using:

a curable acrylic resin (A) having a number average molecular weight of from 2,000 to 20,000 and a glass transition temperature of from 30 to 90° C. obtained by polymerizing a starting monomer containing from 15 to 50 mol % of an unsaturated compound which contains at least a glycidyl group and/or a methylglycidyl group, and from 20 to 50 mol % of methyl methacrylate;

a curing agent (B) capable of being reacted with the glycidyl group or the methylglycidyl group constituting the curable acrylic resin (A); and an alcohol solvent (C) having a boiling point under normal pressure of from 70 to 120° C.;

said method comprising a kneading step of so continuously kneading the curable acrylic resin (A), the curing agent (B) and the alcohol solvent (C) that at least the curing agent (B) is dissolved in the alcohol solvent (C) at a temperature of not higher than 130° C., and a vapor-removing step of continuously vapor-removing the alcohol solvent (C) under a reduced pressure at a temperature of not higher than 130° C.

According to the second embodiment of the present invention, there is further provided a method of producing a powdery coating material by using:

a curable acrylic resin (A) having a number average molecular weight of from 2,000 to 20,000 and a glass transition temperature of from 30 to 90° C. obtained by polymerizing a starting monomer containing from 15 to 50 mol % of an unsaturated compound which contains at least a glycidyl group and/or a methylglycidyl group, and from 20 to 50 mol % of methyl methacrylate;

a curing agent (B) capable of being reacted with the glycidyl group or the methylglycidyl group constituting the curable acrylic resin (A); and an alcohol solvent (D) having a boiling point under normal pressure of from 64 to 120° C.;

wherein, the alcohol solvent (D) is used in an amount of 10 to 200 parts by weight per 100 parts by weight of the curing agent (B);

(I) the curable acrylic resin (A) and the curing agent (B) are continuously fed to a kneading step while side-feeding the alcohol solvent (D) to said kneading step to continuously knead them together at 50 to 130° C., or (II) the curable acrylic resin (A) is continuously fed to the kneading step while side-feeding, to said kneading step, a curing agent solution obtained by dissolving the curing agent (B) in the alcohol solvent (D) to continuously knead them at 50 to 130° C.;

the alcohol solvent (D) is continuously vapor-removed under a reduced pressure at 50 to 130° C. in a vapor-removing step; and said kneading and said vapor-removing of the alcohol solvent (D) are executed at such rates that an average contact time between the curable acrylic resin (A) and the alcohol solvent (D) is not longer than 5 minutes.

The present invention has a distinguished feature in the use of a curable acrylic resin (A) which is a curable resin that is solid at normal temperature and contains, as a constituent unit, an unsaturated monomer containing a glycidyl group and/or a methylglycidyl group (the first and the second embodiments), and an alcohol solvent (C) having a boiling point under normal pressure of from 70 to 120° C. (the first embodiment) or an alcohol solvent (D) having a boiling point of from 64 to 120° C. (the second embodiment) as a dispersing medium for the wet-mixing. That is, by using the curable acrylic resin (A), the curing agent (B) and the alcohol solvent (C) or (D) in combination, it is allowed to homogeneously disperse and mix the resin (A) and the curing agent (B), and to obtain an acrylic powdery coating material capable of forming a film maintaining excellent smoothness and luster. This combination makes it easy to conduct the continuous mixing for homogeneously dispersing the resin (A) and the curing agent (B) and the vapor-removing of the alcohol solvent by using an in-line mixer, a small extruder or a kneader. Namely, the acrylic powdery coating material can be produced without using a large kneader or a large solvent-removing apparatus, further offering a great advantage in economy. Moreover, since additives for the coating material, such as pigment and the like, can be homogeneously dispersed, there is obtained an acrylic powdery coating material capable of forming a film having sharpness.

In the first and the second embodiments of the present invention, the alcohol solvent (particularly, the alcohol solvent (C)) can be also used as a solvent for polymerization at the time of producing the curable acrylic resin (A). The alcohol solution of the curable acrylic resin (A) that is obtained may be used in a form that can be put to the wet-mixing. Further, the alcohol solvent may be side-fed at the time of kneading the curing agent (B) and the curable acrylic resin (A). Or, a curing agent solution (alcohol solution) obtained by dissolving the curing agent (B) in the alcohol solvent may be side-fed at the time of kneading the curable acrylic resin (A).

In the present invention, the side-feed stands for feeding a substance that is to be kneaded into the kneading apparatus through a separate throw port (second throw port) located downstream of a throw port (first throw port) that is communicated with a main feed line.

DETAILED DESCRIPTION OF THE INVENTION

Alcohol Solvents:

The solvent used for the wet-mixing in the present invention is an alcohol solvent (C) having a boiling point under normal pressure of from 70 to 120° C. (the first embodiment) or an alcohol solvent (D) having a boiling point under normal pressure of from 64 to 120° C. (the second embodiment). As the alcohol solvent (C), there can be exemplified an alcohol having 2 to 4 carbon atoms such as ethanol, n-propanol, isopropanol, n-butanol, isobutanol, sec-butanol, and tert-butanol. As the alcohol solvent (D), there can be further exemplified methanol in addition to those exemplified as the alcohol solvent (C). These solvents can be easily vapor-removed by reducing the pressure, and are easily vapor-removed by using an extruder or a kneader that will be described later.

Among these alcohol solvents, the present invention selects the one which is capable of at least dissolving the curing agent (B). The alcohol solvent can be used in one kind or in a mixture of two or more kinds.

It is further allowable to use other solvents in small amounts (e.g., not more than 50 parts by weight per 100 parts by weight of the alcohol solvent) so far as they do not impair the the function for homogeneously dispersing the curable acrylic resin (A) and the curing agent (B) and so far as they can be vapor-removed.

In the present invention (the first and the second embodiments), the alcohol solvents may be fed, via the first throw port, to the kneading apparatus together with other components. Also, the alcohol solvent can be side-fed to the kneading apparatus.

When the alcohol solvent is side-fed, the curable acrylic resin (A) and/or the curing agent (B) may be dissolved in the alcohol solvent to prepare an alcohol solution, and the kneading may be conducted by side-feeding the thus prepared alcohol solution. Namely, the alcohol solution of the curable acrylic resin (A) and the curing agent (B) may be thrown, the alcohol solution of the curable acrylic resin (A) and the alcohol solution of the curing agent (B) may be thrown, or the curable acrylic resin (A) and the alcohol solution of the curing agent may be thrown, into the kneading apparatus to effect the wet-mixing.

The alcohol solution of the curable acrylic resin (A) may be prepared by dissolving the curable acrylic resin (A) that has been obtained in advance in the alcohol solution, or by polymerizing by using the alcohol solvent as a polymerization-solvent. When brought into contact with the curable acrylic resin (A) under the heated condition for extended periods of time, however, "methanol" used in the second embodiment may open the ring of the glycidyl group and the methylglycidyl group. Therefore, when the alcohol solvent contacts with the resin (A) for longer than 5 minutes at higher than 80° C. (for example, the alcohol solution of the resin (A) is used, or the alcohol solvent is used as the polymerization solvent), it is desired to avoid the use of methanol. Because of the same reason, it is also desired to avoid the use of methanol in case the contact with the resin lasts for longer than 3 minutes at not lower than 100° C.

Curable Acrylic Resin (A):

The curable acrylic resin (A) which is solid at normal temperature (20° C.) and is used as a resin component of the powdery coating material in the first and second embodiments of the present invention, is obtained by polymerizing a starting monomer which contains 15 to 50 mol %, preferably, from 25 to 45 mol % of a glycidyl group and/or methylglycidyl group-containing unsaturated compound (hereinafter called glycidyl acrylic compound) and 20 to 50 mol %, preferably 25 to 45 mol %, of methyl methacrylate, and has a number average molecular weight of from 2,000 to 20,000 and a glass transition temperature of from 30 to 90° C.

With respect to the starting monomer, when the glycidyl acrylic compound is used in an amount of smaller than 15 mol %, the obtained coating film exhibits decreased corrosion resistance and hardness. When the amount of its use exceeds 50 mol %, on the other hand, the storage stability of the powdery coating material decreases, the film smoothness decreases, and the appearance decreases. When methyl methacrylate is used in an amount of smaller than 20 mol %, the obtained film exhibits decreased weatherability, and decreased grade of appearance (decreased transparency and decreased feeling of thickness). When the amount of its use exceeds 50 mol %, on the other hand, the obtained film exhibits decreased smoothness and degraded appearance.

Accordingly, the curable acrylic resin (A) contains 15 to 50 mol % and, preferably, 25 to 45 mol % of a constituent unit stemming from the glycidyl acrylic compound and, further, contains 20 to 50 mol %, and preferably, 25 to 45 mol % of a constituent unit stemming from methyl methacrylate. As required, further, the curable acrylic resin (A) may contain constituent units stemming from other unsaturated compounds. The curable acrylic resin (A) containing these constituent units exhibits effects same as those described above.

The curable acrylic resin (A) is obtained by, for example, copolymerizing the glycidyl group and/or methylglycidyl group-containing unsaturated compound (glycidyl acrylic compound), methyl methacrylate and, as required, other unsaturated compounds.

Though not limited thereto only, examples of other unsaturated compounds used, as required, for the copolymerization of the glycidyl acrylic compound and methyl methacrylate include methyl acrylate, ethyl methacrylate, ethyl acrylate, n-butyl methacrylate, n-butyl acrylate, i-butyl methacrylate, i-butyl acrylate, t-butyl methacrylate, t-butyl acrylate, 2-ethylhexyl methacrylate, 2-ethylhexyl acrylate, lauryl methacrylate, lauryl acrylate, cyclohexyl methacrylate, cyclohexyl acrylate, 2-hydroxyethyl methacrylate, 2-hydroxyethyl acrylate, caprolactone-modified 2-hydroxyethyl methacrylate, caprolactone-modified 2-hydroxyethyl acrylate, styrene, α-methylstyrene, acrylonitrile, acrylamide and methacrylamide.

There is no particular limitation on the amount of use of the above other unsaturated compounds provided the amount of constituent units stemming from the glycidyl acrylic compound and the methyl methacrylate lies within the above-mentioned ranges. In general, however, the amount of the other unsaturated compound lies in a range of from 20 to 60 mol % per the whole monomers.

Copolymerization of the glycidyl acrylic compound and the methyl methacrylate is conducted by dispersing or dissolving these compounds in the polymerization-solvent together with the polymerization initiator such as azobisisobutylonitrile and polymerizing them under the conditions of 50 to 150° C. under normal pressure to 20 MPa. After the polymerization, the polymerization-solvent is removed to obtain a desired curable acrylic resin (A) which is solid at normal temperature.

As the polymerization-solvent, there can be used an aromatic hydrocarbon solvent such as toluene or xylene, or the above-mentioned solvent for the wet-mixing. In the present invention, however, there can be preferably used a solvent for the wet-mixing (i.e., alcohol solvent (C) having a boiling point under normal pressure of from 70 to 120° C.) except methanol. The solvent for the wet-mixing is lowly compatible with the resin that is obtained and has a low boiling point, and can be easily removed. As compared to the aromatic hydrocarbon solvent such as toluene, further, the solvent for the wet-mixing easily dissolves the curing agent (B). Methanol should not be used as the polymerization-solvent since it is reactive with the glycidyl acrylic compound and may cause side reactions during the polymerization reaction.

The polymerization-solvent is, usually, used in such an amount that the concentration thereof is from 10 to 90% by weight in the whole polymerization reaction components (inclusive of the polymerization-solvent).

It is desired that the copolymerization is conducted until the degree of polymerization becomes not smaller than 98%, preferably, not smaller than 99% and, most preferably, not smaller than 99.5%. When the degree of polymerization is low, a laborious work is required for removing the unreacted monomers.

It is desired that the thus obtained curable acrylic resin (A) which is solid at normal temperature has a number average molecular weight in a range of from 2,000 to 20,000, preferably, from 2,500 to 10,000 and, more preferably, from 3,000 to 8,000, and has glass transition temperature in a range of from 30 to 90° C., preferably, from 35 to 80° C. and, more preferably, from 40 to 70° C. When the number average molecular weight and the glass transition temperature are smaller than the above-mentioned ranges, the powdery coating material that is obtained exhibits decreased preservation stability and the film formed from the coating material may lose flexibility. When the number average molecular weight and the glass transition temperature are larger than the above-mentioned ranges, on the other hand, the curable acrylic resin (A) is less blended with the alcohol solvent for the wet-mixing, making it difficult to obtain a powdery coating material of a homogeneous composition or to form a film having excellent smoothness.

In the present invention, the number average molecular weight is measured by the gel permeation chromatography (GPC). The sample is a tetrahydrofuran solution in which the resin is dissolved in an amount of 0.3 parts per 100 parts by weight of the tetrahydrofuran, and is measured by the GPC, e.g., by the GPC, Model 8020, manufactured by Toso Co., and the number average molecular weight is calculated as polystyrene.

Further, the glass transition temperature (° C.) is measured by the DSC method (differential scanning calorimetric method, raising the temperature at a rateof 10° C./min.), and a glass transition temperature (Tmg) at an intermediate point is regarded to be the glass transition temperature (Tg).

The curable acrylic resin (A) which is solid at normal temperature is fed to a kneading step as will be described later. When the above-mentioned alcohol solvent for the wet-mixing is used as a polymerization-solvent, the alcohol solution of the curable acrylic resin (A) which is the product of polymerization can be directly fed to the kneading step without removing the polymerization-solvent.

Curing Agent (B):

The curing agent (B) used in the present invention is reactive with the glycidyl group in the above-mentioned curable acrylic resin (A). Though not limited thereto only, examples of the curing agent (B) include dibasic acids or anhydrides thereof such as azelaic acid, nonanoic diacid, sebacic acid, dodecanoic diacid, adipic acid, maleic acid, isophthalic acid, naphthalenedicarboxylic acid, succinic anhydride, phthalic anhydride and itaconic anhydride; polybasic acids or anhydrides thereof such as trimellitic acid, pyromellitic acid, trimellitic anhydride and pyromellitic anhydride; amine or diamine compounds such as metaphenylene diamine, metaxylene diamine, dicyan diamide, aliphatic amine and alicyclic amine; amide compounds; melamine compounds; hydrazine compounds; maleimide compounds; and cyanate compounds, which can be used in a single kind or in a combination of two or more kinds. Among them, a dibasic acid and, particularly, a dodecanoic diacid can be preferably used in the present invention.

The curing agent (B) is usually used in an amount of from 0.7 to 1.3 equivalents, preferably, from 0.8 to 1.2 equivalents and, more preferably, from 0.8 to 1.1 equivalents per the glycidyl group and/or the methylglycidyl group in the curable acrylic resin (A).

Additives for the Coating Material:

In the method of producing the powdery coating material of the present invention, there can be used, as required, known additives for the coating material, such as melt fluidization-adjusting agent, pinhole-preventing agent, ultraviolet ray absorber, antioxidant, curing catalyst, plasticizer, anti-blocking agent, powder fluidization-imparting agent and de-foaming agent in addition to the above-mentioned curable acrylic resin (A) and the curing agent (B).

The additives for the coating material are used in such amounts as to exhibit predetermined functions without spoiling properties such as film-forming property of the powdery coating material. For example, the additives are used in an amount of from 0.1 to 10 parts by weight par 100 parts by weight of the curable acrylic resin (A).

Pigments:

The present invention further uses a pigment depending upon the use of the powdery coating material. Though not limited thereto only, the pigment may be titanium oxide, red iron oxide, phthalocyanine blue, phthalocyanine green, carbon black or iron oxide.

The pigment is usually used in an amount of not larger than 200 parts by weight per 100 parts by weight of the curable acrylic resin (A).

Mixing/kneading:

In the present invention, the above-mentioned curable acrylic resin (A), curing agent (B), additives which are, as required, used for the coating material and pigment, are continuously wet-kneaded in the presence of the above-mentioned alcohol solvent (alcohol solvent (C) or (D)) for the wet-mixing and, then, the alcohol solvent is continuously vapor-removed under a reduced pressure. The continuous kneading and the removal of solvent may be conducted at normal temperature or being heated at not higher than 130° C. When the continuous kneading and the removal of solvent is conducted under a heated condition, the heating temperature is set to be not higher than the cross-linking reaction temperature of the resin and the curing agent. As will be described later, further, when the alcohol solvent is side-fed alone or as an alcohol solution of the curing agent (for example, the second embodiment), it is desired to conduct the kneading being heated at 50 to 130° C. to enhance the effect of homogeneous kneading.

In the first embodiment of the present invention, the amount of the alcohol solvent used here is in a range of from 10 to 1000 parts by weight, i.e., the amount of the alcohol solvent in the kneaded composition which is a mixture of the curable acrylic resin (A), curing agent (B) and alcohol solvent, is from 10 to 1000 parts by weight per 100 parts by weight of the curing agent. When the alcohol solution of the resin (A) is used the curing agent (B) is dissolved in the alcohol solvent, it is desired that the amount of the alcohol solvent in the kneaded composition is in a range of from 50 to 1000 parts by weight per 100 parts by weight of the curing agent. In the second embodiment of the present invention, when the alcohol solvent or the alcohol solution of the curing agent (B) is side-fed, the amount of the alcohol can be smaller (10 to 200 parts by weight per 100 parts by weight of the curing agent) than that of the above-mentioned case to exhibit a sufficient degree of wet dispersion enabling the solvent to be easily removed.

When the amount of supplying the alcohol solvent is smaller than the above-mentioned range, the effect of homogeneous kneading by the alcohol solvent decreases. When the amount of supplying the alcohol solvent is larger than the above range, on the other hand, it becomes necessary to use a large kneading/vapor-removing apparatus causing disadvantage in economy. When the alcohol solvent (except methanol) is used as the polymerization-solvent and the alcohol solution of the obtained curable acrylic resin (A) is directly used, it is recommended that the amount of the polymerization-solvent that is used satisfies the above-mentioned conditions.

The above-mentioned continuous kneading and the removal of solvent can be carried out by using a kneading/vapor-removing apparatus that continuously conduct the kneading and the removal of alcohol component volatilized due to a reduction in the pressure. It is further allowable to couple a continuous kneading apparatus and a vapor-removing apparatus in cascade to conduct the continuous kneading and the removal of solvent.

The curable acrylic resin (A), curing agent (B), additives used, as required, for the coating material and pigment can be separately thrown into the kneading/vapor-removing apparatus or to the continuous kneading apparatus. They, however, may be mixed together in advance and may, then, be thrown. Before being thrown, though not being limited thereto, they can be mixed together by using the Henscel's mixer or the tumbler.

In the first and the second embodiments, the alcohol solvent can be directly side-fed to the kneading/vapor-removing apparatus or to the continuous kneading apparatus without being mixed to other components. As described already, further, the alcohol solvent can be used as the alcohol solution of the curable acrylic resin (A). Or, the alcohol solution of the curing agent (B) may be prepared by using the alcohol solvent, and may be side-fed.

In this case, the curing agent (B) may have been completely dissolved in the alcohol solvent or may have been dissolved only partly. When the kneading is conducted in a state where the curing agent (B) is completely dissolved, the curing agent is homogeneously dispersed in the form of fine particles of not larger than 4 μm in the powdery coating material obtained by vapor-removing the solvent. When the alcohol solvent is side-fed, on the other hand, part of the curing agent is not often dissolved. In this case, too, the curing agent is dispersed in the form of fine particles of from about 3 to about 8 μm in the powdery coating material that is obtained.

Further, the additives used, as required, for the coating material and the pigment may be mixed into the curable acrylic resin (A) or into the alcohol solution of the curable acrylic resin (A) so as to be continuously mixed. Or, they may be continuously mixed being dissolved or dispersed in the curing agent (B) or in the alcohol solution of the curing agent (B).

In the present invention, there is no particular limitation on the structure of the kneading/vapor-removing apparatus provided it is equipped with hoppers for stably feeding the components (starting materials for the powdery coating material), metering feeders and metering pumps, and is capable of vapor-removing the solvent under a reduced pressure. In general, however, there is used a monoaxial or biaxial extruder or a monoaxial or biaxial kneader.

As the monoaxial extruder, there is used the one equipped with a rotary shaft having a high shearing shape (such as screw, the Torester type, the Maddock type or of the torpedo type) and a known kneading portion of the notch type or the dulmadge type. As the biaxial extruder, there is preferably used the one equipped with a pair of screw shafts which rotate in the different directions or in the same direction and possess the kneading function. It is desired that either extruder has a vapor-removing port (vent) for removing the volatile components and is capable of vapor-removing the alcohol solvent through the vent under a reduced pressure. When the extruder has a plurality of vent, in particular, the degrees of reduction in the pressure can be separately set in the respective vapor-removing zones to accomplish excellent vapor-removing performance as the degree of reduction in the pressure increases toward the downstream side in the extruder. Further, the solvent or the solution is fed into the kneading zone upstream of the vent. When there are provided a plurality of vents, the solvent or the solution can be fed into any kneading zone, and can be fed from one place or from two or more places being divided from each other. The extruder having such a structure can be represented by, for example, TEM-37BS manufactured by Toshiba Kikai Co.

It is further desired that the kneader that can be used as the kneading/vapor-removing apparatus is of a structure having at least one vapor-removing port (vent), two stirrer shafts arranged in line in the transverse direction in the barrel of the main body, each shaft having a screw and a paddle and being rotated in the same direction at an equal speed, so that the starting materials fed from an upper portion at one end of the barrel are fed into the kneading zone by the screws so as to be kneaded by the paddles, and that the kneaded product is continuously discharged from the lower portion, from the side surface or from the front portion on the other side of the barrel. This kneader can be represented by SC processor or KRC kneader manufactured by Kurimoto Tekkosho Co.

The kneading/vapor-removing apparatus of either type is capable of homogeneously kneading the starting materials of the powdery coating material by supplying the above-mentioned alcohol solvent into the kneading zone.

When used being coupled together in cascade, the continuous kneading apparatus and the vapor-removing apparatus are the above-mentioned monoaxial or biaxial extruders or kneaders. The in-line mixer can be used when the resin solution and the curing agent solution are to be mixed together. When the above-mentioned extruder, kneader or in-line mixer is used as the continuous kneading apparatus, no vent is necessary. In this case, further, the vapor-removing apparatus has the kneading function, and at least some of the above-mentioned alcohol solvent (C) or (D) can be thrown into the vapor-removing apparatus.

Accordingly to the present invention, the alcohol solvent is vaporized and is removed as the vapor thereof being heated under a reduced pressure in the vapor-removing apparatus until the concentration of the nonvolatile components becomes not lower than 98.5% by weight and, preferably, not lower than 99.0% by weight. When the concentration of the nonvolatile components becomes lower than the above value, the anti-blocking property may not be improved.

As will be understood from the foregoing description, the continuous kneading and the removal of the alcohol can be conducted according to a variety of patterns depending upon the apparatus that is used. Described below are some of the representative patterns.

When, for example, the alcohol solution of the curable acrylic resin (A) obtained by the polymerization in the presence of the alcohol solvent is directly used, the continuous kneading and the removal of the alcohol can be conducted according to the following pattern. The alcohol solvent used in this case is the alcohol solvent (C) having a boiling point under normal pressure of from 70 to 120° C. Methanol shall not be used.

Figure 1:
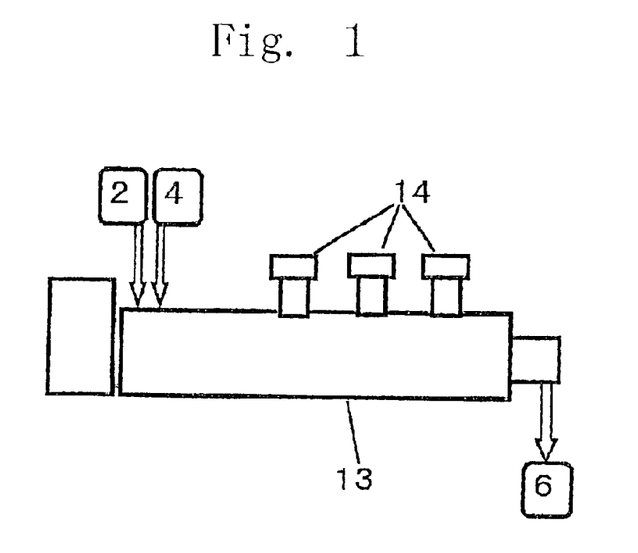
FIGS. 1 to 8 are diagrams illustrating preferred examples of the kneading/vapor-removing process employed by the production method of the present invention.
Figure 2:
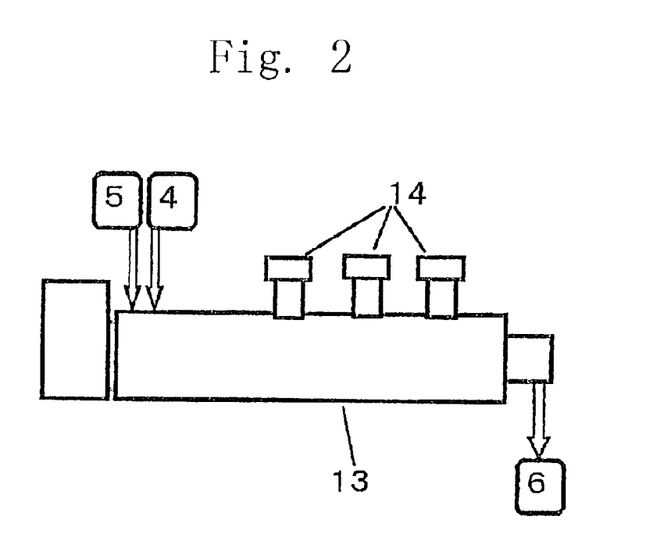

① Referring to FIG. 1, use is made of the above-mentioned kneading/vapor-removing apparatus 13. An alcohol solution 4 of the curable acrylic resin (A) and the curing agent (B) denoted by 2 are fed into the kneading/vapor-removing apparatus 13 to continue the kneading and to remove alcohol solvent through the vents 14, and to take out the kneaded composition 6 from the kneading/vapor-removing apparatus 13. In this case as shown in FIG. 2, it is allowable to prepare a curing agent solution 5 by dissolving the curing agent (B) in the alcohol solvent, and to feed the curing agent solution 5 and the alcohol solution 4 of the curable acrylic resin (A) to the kneading/vapor-removing apparatus 13. In this case, it is desired that the total weight of the alcohol solvent lies within the above-mentioned range.

Figure 3:
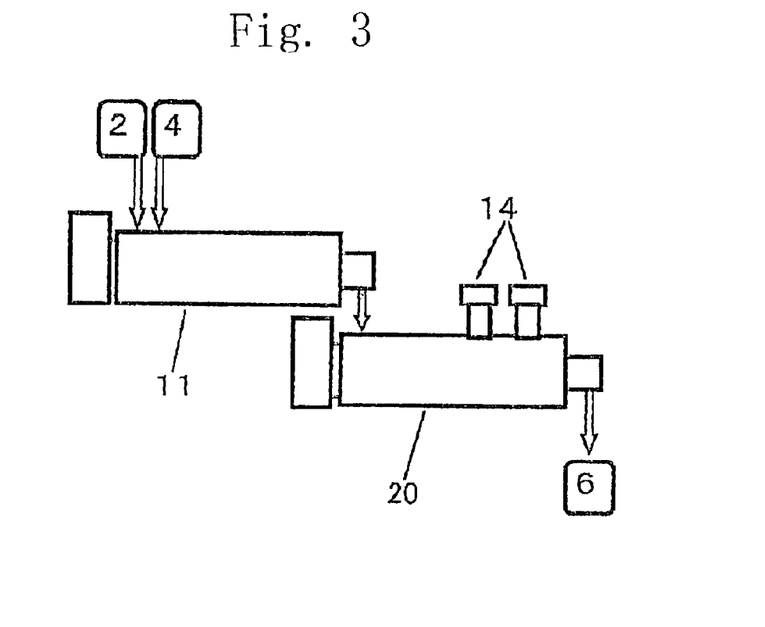
Figure 4:
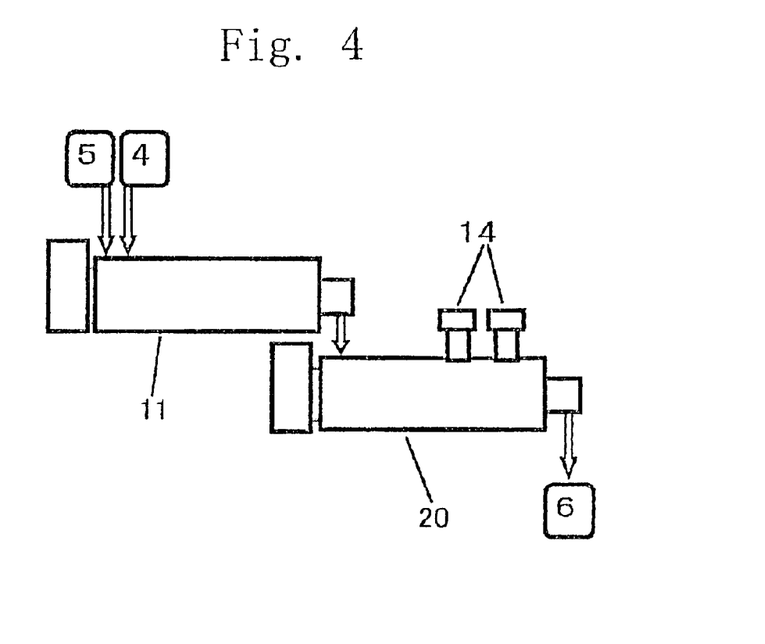

② Referring to FIG. 3, the above-mentioned continuous kneading apparatus 11 and a vapor-removing apparatus 20 are coupled together in cascade. The alcohol solution 4 of the curable acrylic resin (A) and the curing agent (B) denoted by 2 are fed into the continuous kneading apparatus 11 to continue the kneading. The obtained kneaded product is fed from the continuous kneading apparatus 11 into the vapor-removing apparatus 20, the alcohol solvent (C) is vapor-removed through the vents 14, and the kneaded composition 6 is taken out from the vapor-removing apparatus 20. In this case, too, it is allowable to prepare a curing agent solution 5 by dissolving the curing agent (B) in the alcohol solvent (C), and to feed the curing agent solution 5 and the alcohol solution 4 of the curable acrylic resin (A) to the continuous kneading apparatus 11 as shown in FIG. 4 like that of the above-mentioned pattern ①.

When the curable acrylic resin (A) that has been prepared in advance (from which the polymerization-solvent has been removed) is used, the continuous kneading and the removal of the alcohol can be executed by the following pattern. In this case, methanol can be used in addition to the above-mentioned alcohol solvent (C). Namely, there can be used the alcohol solvent (D) having a boiling point under normal pressure of from 64 to 120° C.

Figure 5:
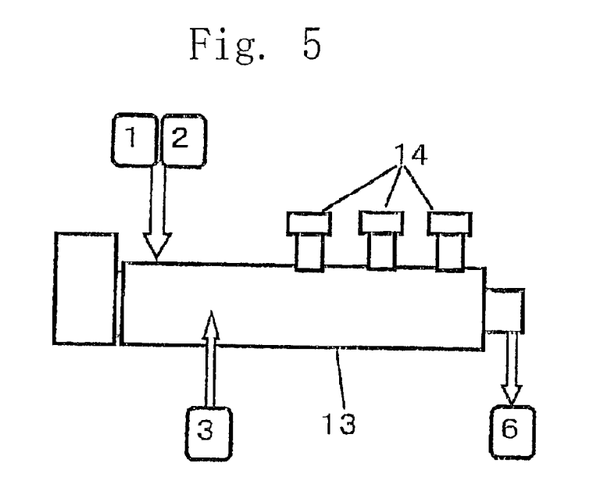
Figure 6:
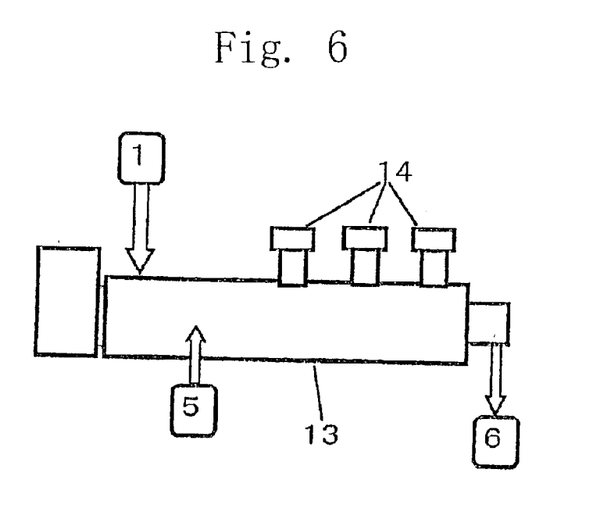

③ Referring to FIG. 5, use is made of the kneading/vapor-removing apparatus 13 same as the one used in the pattern ①. The curable acrylic resin (A) denoted by 1 and the curing agent (B) denoted by 2 are fed to the kneading/vapor-removing apparatus 13 to continue the kneading. The alcohol solvent 3 is directly side-fed into the kneading/vapor-removing apparatus 13 to effect the kneading and the removal of the alcohol solvent through the vents 14, and to take out the kneaded mixture 6 from the kneading/vapor-removing apparatus 13. In this case, too, it is allowable to prepare a curing agent solution 5 by dissolving the curing agent (B) in the alcohol solvent, and to side-feed the curing agent solution 5 into the kneading/vapor-removing apparatus 13 as shown in FIG. 6.

Figure 7:
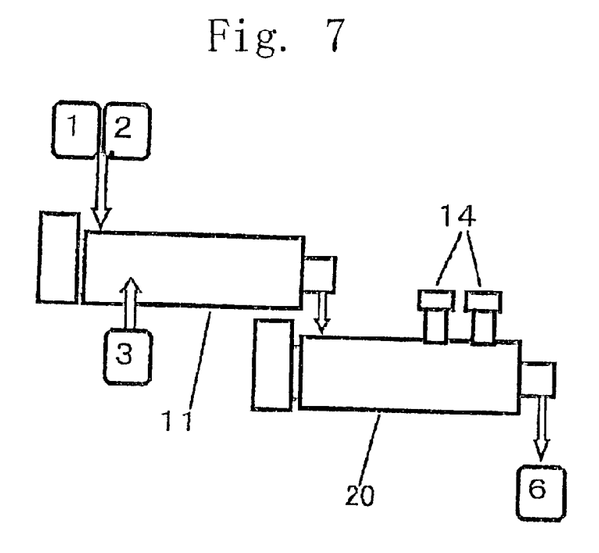
Figure 8:
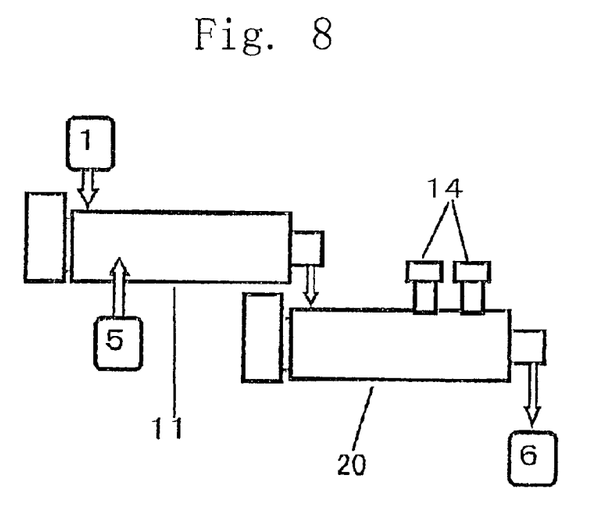

④ Referring to FIG. 7, use is made of the continuous kneading apparatus 11 and the vapor-removing apparatus 20 coupled in cascade like in the pattern ②. The curable acrylic resin 1 and the curing agent 2 are fed into the continuous kneading apparatus 11 to continue the kneading. The alcohol solvent 3 is directly side-fed into the continuous kneading apparatus 11 to effect the kneading and the removal of the alcohol solvent through the vents 14, and to take out the kneaded composition from the solvent-removing apparatus 20. In this case, too, it is allowable to prepare a curing agent solution 5 by dissolving the curing agent (B) in the alcohol solvent, and to side-feed the curing agent solution 5 into the continuous kneading apparatus 11 as shown in FIG. 8.

In any one of the above-mentioned patterns ① to ④, the pigment and the additives used as required for the coating material are usually fed being mixed in advance into the curable acrylic resin (A) or into the alcohol solution of the curable acrylic resin (A). They, however, may be fed being dissolved or dispersed in the alcohol solution of the curing agent (B).

The kneaded composition obtained by removing the alcohol as described above is, as required, pulverized, classified into a predetermined particle size and is used as a powdery coating material. Depending upon the cases, further, a solvent that dissolves the resin only is added to the obtained kneaded composition which is, then, spray-dried to obtain a powdery coating material of nearly a spherical shape making it possible to obtain a smooth film. The volatile solvent used in this case may, preferably, be acetone or the like.

In the thus obtained acrylic powdery coating material, the curing agent (B), the additives used, as required, for the coating material and the pigment are homogeneously dispersed in the curable acrylic resin (A). In particular, the curing agent is existing as fine particles. This powdery coating material makes it possible to obtain a film that exhibits smooth surface and beautiful appearance that could not be accomplished thus far.

EXAMPLES

The invention will now be concretely described by way of Reference Examples, Examples and Comparative Examples to which only, however, the invention is in no way limited as a matter of course. In these Examples, further, the blended amounts are all by weight.

Properties of the powdery coating materials were evaluated in a manner as described below. Concentration of nonvolatile components (% by weight):

The powdery coating material in an amount of 2 g was dried at 140° C. for 30 minutes, and the weight-holding factors (% by weight) were calculated before and after the drying.

Particle Diameter ($\mu$m):

The volume average particle diameters of the powdery coating material and of the starting material of the curing agent were measured by using a laser diffraction scattering particle size distribution-measuring instrument, Model LA-910, manufactured by Horiba Seisakusho Co.

Anti-blocking Property:

The powdery coating material in an amount of 30 g was introduced into a cylindrical container of a diameter of 2 cm, and a mass of the powdery coating material after preserved at 40° C. for 7 days was evaluated on the following basis.

○—No mass or no aggregation is recognized in the powdery coating material.

Δ—Mass is recognized to some extent in the powdery coating material, which, however, is so weakly aggregated that it cannot be nipped by figers.

X—Mass is recognized in the powdery coating material but can be nipped.

Film Appearance (Smoothness):

The powdery coating material was electrostatically applied onto a steel plate treated with zinc phosphate, cured in an oven heated at 160° C. for 20 minutes, and the formed film was evaluated for its smoothness by eyes.

○—Very smooth without dent or ruggedness.

Δ—Smoothness is slightly poor containing dents and ruggedness.

X—Smoothness is poor containing dents and ruggedness to a considerable degree.

Film Thickness:

The film thickness after being applied and cured, was measured by using LZ-300C manufactured by Kett Electric Laboratory Co.

Center Line Mean Roughness Ra:

The surface of the film after being applied and cured was measured by using a probe-type surface roughness meter, SURFCOM, manufactured by Tokyo Seimitsu Co., and was expressed as an average value of ruggedness. Cut off was 0.8 mm. The smaller the value, the more smooth the film is.

Luster (60°):

The surface of the film after being applied and cured was measured for its 60° mirror surface reflection factor (%) in compliance with JIS K5400, 7.6.

Measurement of Particle Diameter of the Curing Agent after Kneaded:

A strand obtained by extruding the powdery coating material composition after kneaded was buried in the molten polyester resin. The polyester resin was cured at normal temperature, and the surface of the sample was polished. The polished surface of the sample was photographed by using a polarized microscope, OPTIPHOT-POL manufactured by Nikon Co. and the particle diameter was measured by eyes (the curing agent is crystalline and appears in a bright color, enabling the particle diameter to be measured).

Film Vividness: Appearance of the Film was Judged by Eyes.

○: Color tone is homogeneous, and image representation is excellent.

Δ: Color tone is slightly unhomogeneous, and image representation is slightly poor.

X: Image representation is poor.

(Using an Alcohol Solution of the Resin)

Example 1

120 Parts of isopropanol were fed into a reactor equipped with a thermometer, a stirrer, a reflux cooler, a pressure adjustor using nitrogen and a bottom drain pipe, and were heated at 110° C., and to which were further added:

40 parts of methyl methacrylate,
30 parts of glycidyl methacrylate,
15 parts of styrene,
15 parts of n-butyl methacrylate, and
4 parts of t-amylperoxyisononanoate, over a period of two hours, and were maintained at the above temperature for three hours to obtain an alcohol solution of a curable acrylic resin (hereinafter called resin solution).

Separately, 22 parts of dodecanoic diacid (curing agent),
0.6 parts of benzoin, and
0.6 parts of PL-540 (fluidity adjusting agent manufactured by Kusumoto Kasei Co.), were mixed together to prepare a curing agent-containing mixture.

The resin solution and the curing agent-containing mixture prepared above were homogeneously mixed together within a short period of time by using a continuous biaxial kneader maintained at 70° C. to obtain a kneaded composition.

The above kneaded composition was then passed into an extruder equipped with a vent for removing the solvent maintained at 90° C. and coupled to the continuous biaxial kneader in cascade thereby to vapor-remove the solvent and to obtain a powdery kneaded composition.

The powdery kneaded composition was pulverized by using a shock-type pulverizer and was further classified to obtain a powdery coating material having an average particle diameter of 25 μm.

The thus obtained powdery coating material was electrostatically applied onto a steel plate treated with zinc phosphate and was cured in an oven heated at 160° C. for 20 minutes to form a film. The thus formed film was evaluated for its properties. Table 1 shows the results together with the properties of the obtained curable acrylic resin.

Example 2

A resin solution was prepared in the same manner as in Example 1 but using the polymerization-solvent in an amount of 70 parts and the t-amylperoxyisononanoate in an amount of 6 parts.

A powdery coating material was prepared in the same manner as in Example 1 but using the above resin solution, preparing an alcohol solution of the curing agent (hereinafter called curing agent solution) by using the above resin solution and by adding 50 parts of methanol to the curing agent-containing mixture, wet-mixing them together by using an in-line mixer and feeding the mixture into the extruder with a vent. The powdery coating material and a film formed therefrom were evaluated for their properties. Table 1 shows the results together with the properties of the obtained curable acrylic resin.

Example 3

An acrylic resin solution was prepared in the same manner as in Example 1 but using 120 parts of ethanol as the polymerization-solvent and changing the polymerization temperature into 90° C.

A powdery coating material was prepared in the same manner as in Example 2 but using the above acrylic resin solution and adding 50 parts of ethanol to the curing agent-containing mixture. The powdery coating material and a film thereof were evaluated for their properties. Table 1 shows the results together with the properties of the obtained curable acrylic resin.

Example 4

A curable acrylic resin solution was prepared in the same manner as in Example 1 but using 33 parts of tert-buntanol as the polymerization-solvent and changing the polymerization temperature into 110° C.

A powdery coating material was prepared in the same manner as in Example 2 but using the above acrylic resin solution and adding 50 parts of ethanol to the curing agent-containing mixture. The powdery coating material and a film thereof were evaluated for their properties. Table 1 shows the results together with the properties of the obtained curable acrylic resin.

Comparative Example 1

An acrylic resin solution was prepared in the same manner as in Example 1 but using 100 parts of xylene as the polymerization-solvent and changing the polymerization temperature into 125° C., and a powdery coating material was also prepared in the same manner. Table 2 shows the evaluated results of properties of the powdery coating material and of the film.

In this case, xylene was not completely vapor-removed in the extruder, the curing agent was not homogeneously dispersed, and the blocking properties and the film properties were inferior.

Comparative Example 2

A powdery coating material was prepared in the same manner as in Comparative Example 1 but adding dodecanoic diacid and 50 parts of isopropanol. Table 2 shows the evaluated results of properties of the powdery coating material and of the film thereof.

Comparative Example 3

A powdery coating material was prepared in the same manner as in Example 3 but adding 180 parts of isopropanol to the curing agent-containing mixture. Table 2 shows the evaluated results of properties of the powdery coating material and of the film thereof.

Comparative Example 4

A powdery coating material was prepared in the same manner as in Example 1 but using 300 parts of isopropanol as the polymerization-solvent. Table 2 shows the evaluated results of properties of the powdery coating material and of the film thereof.

Comparative Example 5

A powdery coating material was prepared in the same manner as in Example 1 but using 150 parts of 1-pentanol as the polymerization-solvent. Table 2 shows the evaluated results of properties of the powdery coating material and of the film thereof.

The solvent was not completely vapor-removed in the extruder, and the blocking properties and the film properties were inferior.

TABLE 1

| | Example 1 | Example 2 | Example 3 | Example 4 |
|---|---|---|---|---|
| Curable acrylic resin | | | | |
| Number average molecular weight | 4500 | 5200 | 4700 | 4800 |
| Tg (° C.) | 51 | 51 | 50 | 50 |
| Powder Paint | | | | |
| Non-Volatile concentration (wt %) | 99.5 | 99.6 | 99.8 | 99.5 |
| Particle diameter (μm) | 34 | 29 | 30 | 28 |
| Anti-blocking property | ○ | ○ | ○ | ○ |
| Film thickness (μm) | 45 | 45 | 43 | 42 |
| Film appearance (smoothness) | ○ | ○ | ○ | ○ |
| Luster (60°) | 95 | 94 | 93 | 92 |
| Center line average surface roughness Ra (μm) | 0.06 | 0.05 | 0.05 | 0.06 |
| Particle diameter of curing agent | | | | |
| Average diameter of starting material (μm) | 20 | 20 | 20 | 20 |
| Particle diameter after kneading (μm) | <1 | <1 | <1 | <1 |

TABLE 2

| | Comparative Example 1 | Comparative Example 2 | Comparative Example 3 | Comparative Example 4 | Comparative Example 5 |
|---|---|---|---|---|---|
| Curable acrylic resin | | | | | |
| Number average molecular weight | 5400 | 5400 | 5300 | 4900 | 5500 |
| Tg (° C.) | 51 | 51 | 51 | 51 | 51 |
| Powder Paint | | | | | |
| Non-volatile concentration (wt %) | 97.8 | 97.2 | 98.2 | 98.0 | 97.8 |
| Particle diameter (μm) | 31 | 23 | 25 | 20 | 23 |
| Anti-blocking property | X | X | Δ | Δ | X |
| Film thickness (μm) | 52 | 53 | 49 | 52 | 48 |
| Film appearance (smoothness) | X | X | Δ | Δ | X |
| Luster (60°) | 88 | 85 | 87 | 85 | 84 |
| Center line average surface roughness Ra (μm) | 0.15 | 0.09 | 0.11 | 0.11 | 0.12 |
| Particle diameter of curing agent | | | | | |
| Average diameter of starting material (μm) | 20 | 20 | 20 | 20 | 20 |
| *Particle diameter after kneading (μm) | 9~13 | 3~7 | <1 | <1 | 1~3 |

*the particle diameter of curing agent after kneading shows the particle diameter range in more than 90% particles

Reference Example 1

100 Parts (parts by weight, the same holds hereinafter) of xylene were fed into a reactor equipped with a thermometer, a stirrer, a reflux cooler, a pressure adjustor using nitrogen and a bottom drain pipe, and were heated at 115° C., and to which were further added:

40 parts of methyl methacrylate,
30 parts of glycidyl methacrylate,
15 parts of styrene,
15 parts of n-butyl acrylate, and
4 parts of azobisisobutylonitrile, over a period of four hours, and were maintained at the above temperature for six hours to obtain a resin solution.

The obtained resin solution was distilled off at 200° C. under a reduced pressure (0.13 kPa) until no solvent was distilled off, and was, then, cooled to obtain a curable acrylic resin which was solid at normal temperature.

The resin possessed a number average molecular weight of 5100 and a glass transition temperature Tg of 51° C.

50 Parts of the obtained curable acrylic resin were coarsely pulverized by using a pulverizer, and to which were added and dry-blended:

11 parts of dodecanoic diacid (curing agent),
0.3 parts of surface adjusting agent (PL-540 manufactured by Kusumoto Kasei Co.), and 0.3 parts of benzoin,
in order to prepare a starting mixture for preparing an acrylic powdery coating material.

Reference Example 2

A starting mixture for preparing an acrylic powdery coating material was prepared in quite the same manner as in Reference Example 1 but without using the curing agent. (Side-feeding of Alcohol)

Example 5

A three-vent biaxial extruder, TEM-37BS (manufactured by Toshiba Kikai Co.), was used as a kneading/vapor-removing apparatus.

That is, the starting mixture for preparing the acrylic powdery coating material obtained in Reference Example 1 was fed to the kneading/vapor-removing apparatus and was extruded at a cylinder temperature of 90° C., at a screw rotational speed of 170 rpm and at a rate of 61.6 kg/h.

Here, methanol was fed at a rate of 3 kg/h into a first kneading zone downstream of the starting material feed port of the kneading/vapor-removing apparatus, and the volatile component was partly removed through a first vent on the downstream side adjusted at 53 kPa while continuously kneading the starting material for obtaining the acrylic powdery coating material. Then, the kneading and removal of solvent were conducted through a second kneading zone, a second vent (6.7 kPa), a third kneading zone and a third vent (0.67 kPa) thereby to obtain a kneaded composition.

By using the kneaded composition, a powdery coating material was produced in the same manner as in Example 1. The powdery coating material and a film thereof were evaluated for their properties. The results were as shown in Table 3.

Example 6

A powdery coating material was produced in the same manner as in Example 5 but using, as a solvent, isopropanol instead of methanol. The powdery coating material and a film thereof were evaluated for their properties. The results were as shown in Table 3.

Example 7

A powdery coating material was produced in the same manner as in Example 5 but feeding the solvent at a rate of 6 kg/h instead of 3 kg/h. The powdery coating material and a film thereof were evaluated for their properties. The results were as shown in Table 3.

Example 8

A powdery coating material was produced in the same manner as in Example 5 but feeding the solvent at a rate of 4 kg/h into the first kneading zone and feeding the solvent at a rate of 2 kg/h into the second kneading zone. The powdery coating material and a film thereof were evaluated for their properties. The results were as shown in Table 3.

Example 9

A continuous biaxial kneader, KRC Kneader, Model S1 (manufactured by Kurimoto Tekkojo Co., screw diameter of 25 mm) was used as a continuous kneading apparatus, and a monoaxial extruder, TP20 (manufactured by Thermoplastic Kogyo Co., screw diameter of 20 mm) was used as a vapor-removing apparatus being coupled to the kneader in cascade.

The starting mixture for producing the powdery coating material obtained in Reference-Example 1 was fed at a rate of 2 kg/h into the hopper of the kneader by using a metering feeder, methanol was fed at a rate of 120 g/h into the body of the kneader, and the mixture was continuously kneaded at a cylinder temperature of 90° C. and at a screw rotational speed of 100 rpm.

The kneaded composition was directly fed into the vapor-removing apparatus adjusted at a cylinder temperature of 90° C. and a screw rotational speed of 100 rpm to remove the solvent under the condition of a vent pressure of 1 kPa. Here, the average contact time between the curable acrylic resin and the methanol at 90° C. was one minute.

A powdery coating material was produced from the kneaded composition from which the solvent has been vapor-removed in the same manner as in Example 5. The powdery coating material and a film thereof were evaluated for their properties. The results were as shown in Table 3.

Comparative Example 6

A powdery coating material was produced in the same manner as in Example 5 but kneading the starting material of acrylic powdery coating material without feeding methanol. The powdery coating material and a film thereof were evaluated for their properties to find that they lacked smoothness and luster. The results were as shown in Table 4.

Comparative Example 7

A powdery coating material was produced in the same manner as in Example 5 but feeding toluene instead of methanol. The powdery coating material and a film thereof were evaluated for their properties to find that they lacked smoothness and luster. The results were as shown in Table 4.

Comparative Example 8

A powdery coating material was produced in the same manner as in Example 5 but feeding a starting mixture for preparing the powdery coating material into the kneader at a rate of 200 g/h, feeding methanol at a rate of 12 g/h and turning the screw of the kneader at a speed of 10 rpm. The average contact time between the curable acrylic resin and the methanol at 90° C. was 12 minutes. The powdery coating material and a film thereof were evaluated for their properties. The results were as shown in Table 4.

TABLE 3

|  | Example 1 | Example 2 | Example 3 | Example 4 | Example 5 |
|---|---|---|---|---|---|
| Powder paint |  |  |  |  |  |
| Non-volatile concentration (wt %) | 99.8 | 99.7 | 99.6 | 99.9 | 99.8 |
| Average particle diameter ($\mu$m) | 25 | 23 | 24 | 28 | 25 |
| Anti-blocking property | ○ | ○ | ○ | ○ | ○ |
| Film thickness ($\mu$m) | 42 | 40 | 43 | 38 | 42 |
| Film appearance (smoothness) | ○ | ○ | ○ | ○ | ○ |
| Center line average surface roughness Ra ($\mu$m) | 0.06 | 0.07 | 0.07 | 0.06 | 0.06 |
| Particle diameter of curing agent |  |  |  |  |  |
| Average diameter of starting material ($\mu$m) | 20 | 20 | 20 | 20 | 20 |
| *Particle diameter after kneading ($\mu$m) | 3~7 | 4~8 | 1~5 | 3~7 | 3~7 |

*the particle diameter of curing agent after kneading shows the particle diameter range in more than 90% particles

TABLE 4

|  | Comparative Example 1 | Comparative Example 2 | Comparative Example 3 |
|---|---|---|---|
| Powder paint |  |  |  |
| Non-volatile concentration (wt %) | 99.8 | 99.7 | 99.8 |
| Average particle diameter ($\mu$m) | 25 | 25 | 24 |
| Anti-blocking property | ○ | ○ | X |
| Film thickness ($\mu$m) | 44 | 45 | 45 |
| Film appearance (smoothness) | X | X | Δ |
| Center line average surface roughness a ($\mu$m) | 0.15 | 0.14 | 0.13 |
| Particle diameter of curing agent |  |  |  |
| Average diameter of starting material ($\mu$m) | 20 | 20 | 20 |
| *Particle diameter after kneading ($\mu$m) | 10~16 | 10~15 | 3~8 |

*the particle diameter of curing agent after kneading shows the particle diameter range in more than 90% particles (Side-feeding the Curing Agent Solution)

Example 10

By using the kneading/vapor-removing apparatus used in Example 5, the starting mixture for preparing the acrylic powdery coating material obtained in Reference Example 2 was fed to the above apparatus and was extruded at a cylinder temperature of 90° C., at a screw rotational speed of 170 rpm and at a rate of 50.6 kg/h.

There was further prepared a curing agent solvent comprising 11 parts by weight of dodecanoic diacid and 19 parts by weight of methanol and heated at 80° C.

While the starting mixture for preparing the acrylic powdery coating material was being fed, the curing agent solvent was fed at a rate of 30 kg/h into the first kneading zone downstream of the starting material feed port of the kneading/vapor-removing apparatus, and the volatile component was partly removed through the first vent on the downstream side adjusted at 53 kPa while continuously kneading the starting material for preparing the acrylic powdery coating material. Then, the kneading and the removal of solvent were conducted through the second kneading zone, the second vent (6.7 kPa), the third kneading zone and the third vent (0.67 kPa) thereby to obtain a kneaded composition.

By using the kneaded composition from which the solvent has been removed, a powdery coating material was produced in the same manner as in Example 1. The powdery coating material and a film thereof were evaluated for their properties. The results were as shown in Table 5.

Example 11

A powdery coating material was produced in the same manner as in Example 10 but using a curing agent solvent prepared by using isopropanol instead of methanol. The powdery coating material and a film thereof were evaluated for their properties. The results were as shown in Table 5.

TABLE 5

|  | Example 10 | Example 11 |
|---|---|---|
| Powder paint |  |  |
| Non-volatile concentration (wt %) | 99.8 | 99.7 |
| Average particle diameter ($\mu$m) | 25 | 23 |
| Anti-blocking property | ○ | ○ |
| Film thickness ($\mu$m) | 40 | 43 |
| Film appearance (smoothness) | ○ | ○ |
| Center line average surface roughness Ra ($\mu$m) | 0.07 | 0.07 |
| Particle diameter of curing agent |  |  |
| Average diameter of starting material ($\mu$m) | 20 | 20 |
| *Particle diameter after kneading ($\mu$m) | <1 | <1 |

*the particle diameter of curing agent after kneading shows the particle diameter range in more than 90% particles (Using a Pigment)

Example 12

A powdery coating material was produced in the same manner as in Example 1 but adding 25 parts of titanium oxide to the starting mixture for preparing the acrylic powdery coating material of Reference Example 1. The powdery coating material and a film thereof were evaluated for their properties. Table 6 shows the results together with the properties of the obtained curable acrylic resin.

Comparative Example 9

A powdery coating material was produced in the same manner as in Comparative Example 6 but adding 25 parts of titanium oxide to the starting mixture for preparing the acrylic powdery coating material of Reference Example 1. The powdery coating material and a film thereof were evaluated for their properties. Table 6 shows the results together with the properties of the obtained curable acrylic resin.

TABLE 6

| | Example 12 | Comparative Example 9 |
|---|---|---|
| Powder paint | | |
| Number average molecular weight | 4600 | 5000 |
| Resin Tg (° C.) | 51 | 51 |
| Non-volatile concentration (wt %) | 99.7 | 98.0 |
| Particle diameter (μm) | 32 | 25 |
| Anti-blocking property | ○ | Δ |
| Film thickness (μm) | 49 | 49 |
| Film appearance (smoothness) | ○ | Δ |
| Luster (60°) | 92 | 85 |
| Sharpness | ○ | X |
| Particle diameter of curing agent | | |
| Average diameter of starting material (μm) | 20 | 20 |
| *Particle diameter after kneading (μm) | <1 | 10~16 |

*the particle diameter of curing agent after kneading shows the particle diameter range in more than 90% particles

What is claimed is:

1. A method of producing a powdery coating material by using:
   a curable acrylic resin (A) having a number average molecular weight of from 2,000 to 20,000 and a glass transition temperature of from 30 to 90° C. obtained by polymerizing a starting monomer containing from 15 to 50 mol % of an unsaturated compound which contains at least a glycidyl group and/or a methylglycidyl groups, and from 20 to 50 mol % of methyl methacrylate in a polymerization solvent selected from the group consisting of toluene, xylene and an alcohol solvent having a boiling point under normal pressure of from 70 to 120° C. such that when the toluene or the xylene is used as the polymerization solvent, said solvent is vapor-removed prior to being kneaded with the curable acrylic resin (A), a curing agent (B) and the alcohol solvent (C);
   the curing agent (B) capable of being reacted with the glycidyl group or the methylglycidyl group constituting the curable acrylic resin (A); and
   the alcohol solvent (C) having a boiling point under normal pressure of from 70 to 120° C.;
   said method comprising a kneading step of continuously kneading the curable acrylic resin (A), the curing agent (B) and the alcohol solvent (C) so that at least the curing agent (B) is dissolved in the alcohol solvent (C) at a temperature of not higher than 130° C., and a vapor-removing step of continuously vapor-removing the alcohol solvent (C) under a reduced pressure at a temperature of not higher than 130° C.
   wherein the powdery coating material is obtained by pulverizing a mixture of the curing agent (B) and the curable acrylic resin (A) obtained by removing the alcohol solvent (C) therefrom.

2. A method of producing a powdery coating material according to claim 1, wherein the curing agent (B) is used in such an amount that its functional groups are 0.7 to 1.3 equivalents per the glycidyl group and/or the methylglycidyl group constituting the curable acrylic resin (A).

3. A method of producing a powdery coating material according to claim 1, wherein the curable acrylic resin (A) contains a constituent unit stemming from the glycidyl group and/or methylglycidyl group-containing unsaturated compound in an amount of from 25 to 45 mol % and contains a constituent unit stemming from the methyl methacrylate in an amount of from 25 to 45 mol %, and has a number average molecular weight of from 2,500 to 10,000 and a glass transition temperature of from 35 to 80° C.

4. A method of producing a powdery coating material according to claim 1, wherein the curing agent (B) is at least one selected from the group consisting of a dibasic acid compound or an anhydride thereof, a polybasic acid compound which is not lower than tribasic acid or an anhydride thereof, a diamine compound, an amine compound, an amide compound, a melamine compound, a hydrazine compound, a maleimide compound and a cyanate compound.

5. A method of producing a powdery coating material according to claim 1, wherein the alcohol solvent (C) is used in an amount of from 50 to 1000 parts by weight per 100 parts by weight of the curing agent (B).

6. A method of producing a powdery coating material according to claim 1, wherein the alcphol solvent (C) is an alcohol having 2 to 4 carbon atoms or a mixture thereof.

7. A method of producing a powdery coating material according to claim 1, wherein the curable acrylic resin (A) is prepared by the polymerization reaction by using the alcohol solvent (C) as a polymerization-solvent, and a mixture of the curable acrylic resin (A) obtained by the polymerization reaction and the alcohol solvent (C) is kneaded with the curing agent (B), or with the curing agent (B) and the alcohol solvent (C).

8. A method of producing a powdery coating material according to claim 1, wherein the kneading step of kneading the curable acrylic resin (A), curing agent (B) and alcohol solvent (C) and the vapor-removing step of removing the alcohol (C), are continuously executed by using a single kneading/vapor-removing apparatus.

9. A method of producing a powdery coating material according to claim 8, wherein the kneading/vapor-removing apparatus is a monoaxial or biaxial extruder or kneader having at least one vapor-removing port.

10. A method of producing a powdery coating material according to claim 1, wherein an apparatus used in the kneading step of kneading the curable acrylic resin (A), curing agent (B) and alcohol solvent (C) and an apparatus used in the vapor-removing step of removing the alcohol solvent (C), are coupled together in cascade to continuously execute the kneading and the removal of solvent.

11. A method of producing a powdery coating material according to claim 10, wherein the apparatus used in the kneading step is a monoaxial or biaxial extruder, a monoaxial or biaxial kneader, or an in-line mixer.

12. A method of producing a powdery coating material according to claim 10, wherein the apparatus used in the vapor-removing step is a monoaxial or biaxial extruder, or a monoaxial or biaxial kneader having at least one solvent-removing port.

13. A method of producing a powdery coating material according to claim 1, wherein a curing agent solution is prepared by dissolving the curing agent (B) in the alcohol solvent (C) and, separately, a curable acrylic resin solution is prepared by dissolving the curable acrylic resin (A) in the alcohol solvent (C), and the curing agent solution and the curable acrylic resin solution are kneaded together.

14. A method of producing a powdery coating material according to claim 1, wherein at least one component selected from a pigment and additives for blending with the coating material, is fed to the kneading step, thereby to conduct the kneading.

* * * * *